(12) United States Patent
Wang et al.

(10) Patent No.: US 9,161,006 B1
(45) Date of Patent: Oct. 13, 2015

(54) SYSTEMS AND METHODS FOR EFFICIENT SCREEN CAPTURE

(71) Applicant: Kamcord, Inc., San Francisco, CA (US)

(72) Inventors: Kevin Wang, San Francisco, CA (US); Dennis Qin, San Francisco, CA (US); Peterson Trethewey, San Francisco, CA (US); Pat Plunkett, Oakland, CA (US); Sam Green, San Francisco, CA (US)

(73) Assignee: Kamcord, Inc., San Francisco, CA (US)

( * ) Notice: Subject to any disclaimer, the term of this patent is extended or adjusted under 35 U.S.C. 154(b) by 0 days.

(21) Appl. No.: 14/562,007

(22) Filed: Dec. 5, 2014

(51) Int. Cl.
  *G06T 1/60* (2006.01)
  *H04N 9/79* (2006.01)
  *G06T 11/00* (2006.01)

(52) U.S. Cl.
  CPC .. *H04N 9/79* (2013.01); *G06T 1/60* (2013.01); *G06T 11/001* (2013.01); *G06T 2200/28* (2013.01)

(58) Field of Classification Search
  CPC .......... H04N 9/79; G06T 1/60; G06T 11/001; G06T 2200/28
  See application file for complete search history.

(56) References Cited

U.S. PATENT DOCUMENTS

| | | | | |
|---|---|---|---|---|
| 6,466,220 | B1 * | 10/2002 | Cesana et al. | 345/537 |
| 2007/0071344 | A1 * | 3/2007 | Ouzilevski et al. | 382/254 |
| 2009/0251475 | A1 * | 10/2009 | Mathur et al. | 345/533 |
| 2012/0092277 | A1 * | 4/2012 | Momchilov | 345/173 |
| 2014/0155171 | A1 | 6/2014 | Laakkonen et al. | |
| 2014/0156037 | A1 | 6/2014 | Laakkonen et al. | |
| 2014/0228112 | A1 | 8/2014 | Laakkonen et al. | |

OTHER PUBLICATIONS

Everyplay Developers, "Record and Share Your Gameplay," retrieved from Everyplay Developers website on Dec. 18, 2014: <https://developers.everyplay.com/documentation>, 5 pages.
Fraps Real-time video capture & benchmarking, (Feb. 26, 2013) "Welcome to the Fraps website!," retrieved from FRAPS website on Dec. 18, 2014: <http://fraps.com/>, 3 pages.
Muhlestein, Dennis (Dec. 8m, 2011) All My Brain, "Rendering to a texture with iOS 5 texture cache api.," retrieved from ALL MY BRAIN website on Dec. 18, 2014: <http://allmybrain.com/2011/12/08/rendering-to-a-texture-with-ios-5-texture-cache-api/>, 37 pages.
XSPLIT Gamecaster, Version 2, "Broadcast your Gameplay. Conquer the World," retrieved from XSPLIT website on Dec. 18, 2014: <https://www.xsplit.com/products/gamecaster>, 14 pages.

(Continued)

*Primary Examiner* — Kee M Tung
*Assistant Examiner* — Nicholas R. Wilson
(74) *Attorney, Agent, or Firm* — Goodwin Procter LLP

(57) ABSTRACT

Systems and methods are provided for efficient screen capture and video recording on mobile and other devices. The video is recorded using a graphics rendering pipeline that includes a primary frame buffer, a secondary frame buffer, and a video writer module that encodes and writes data to a video file. The frame buffers include multiple textures to which graphics data can be rendered or copied, with at least the secondary frame buffer textures backed with memory that is quickly accessible by a central processing unit. In operation, a frame is rendered into a texture in the primary frame buffer, and the contents of the rendered frame are copied to a texture of the secondary frame buffer as well as to a default graphics rendering pipeline for output to a display. The contents of the rendered frame are then provided from the secondary frame buffer to the video writer for output to a video file.

18 Claims, 8 Drawing Sheets

(56) References Cited

OTHER PUBLICATIONS

XSPLIT Broadcaster, Version 2, "Simple yet Powerful Live Streaming and Recording Software," retrieved from XSPLIT website on Dec. 18, 2014: <https://www.xsplit.com/products/broadcaster>, 14 pages.

Fink, H., (Aug. 14, 2013) "GPU-based Video Processing in the Context of TV Broadcasting", Master's Thesis in partial fulfillment of the requirements of the degree of Diplom-Ingenieur in Visual Computing, *Faculty of Informatics*, Vienna University of Technology, pp. A-127.

* cited by examiner

SYSTEMS AND METHODS FOR EFFICIENT SCREEN CAPTURE

BACKGROUND

The present disclosure relates generally to digital video recording and, more particularly, to systems and methods for efficient screen capture of a mobile application for the creation of digital video recordings via an integrated software library.

Mobile devices, such as smartphones, have specialized hardware and software that implicate unique considerations when providing for video processing functionality, as compared to desktop and laptop computers running, for example, the MICROSOFT WINDOWS operating system or the APPLE OS X operating system. There currently are, however, no third-party video recording solutions for mobile games and applications that support the intricacies of these mobile integrated graphical solutions while providing for minimal performance overhead.

BRIEF SUMMARY

Systems and methods are described for efficient screen capture using a third-party library integrated into a mobile application. As one example, a mobile game developer can obtain the library and integrate it into a game by, for example, utilizing an application programming interface provided by the library. In execution, the functionality provided by the library allows game sessions to be manually or automatically recorded on behalf of the user. Upon completion of a recording, a user interface can allow the player to review and edit the created video, and upload the video to the internet for sharing via social media.

In one aspect, a method for efficient screen capture includes the steps of: providing a video recording pipeline comprising: a primary frame buffer comprising a first plurality of textures; a secondary frame buffer comprising a second plurality of textures each comprising memory accessible by a central processing unit; and a video writer module for writing data to a video file; receiving into a texture of the primary frame buffer a rendering of a frame; copying contents of the rendered frame to a texture of the secondary frame buffer and to a default graphics rendering pipeline for output to a display; and providing the contents of the rendered frame from the secondary frame buffer to the video writer for output to a video file.

The primary frame buffer and/or the secondary frame buffer can be configured as a circular buffer of textures, and the first and/or second pluralities of textures can include OPENGL textures.

The rendered frame can be received from an application on a mobile device, and the video recording pipeline can be provided as a library that interfaces with the mobile device application.

In one implementation, providing the rendered frame to the default graphics rendering pipeline includes copying contents of the rendered frame to a default frame buffer in the default graphics rendering pipeline.

In another implementation, the method includes switching to a next one of the textures in the primary frame buffer such that a next received frame is rendered into the next texture of the primary frame buffer. The method can further include switching to a next one of the textures in the secondary frame buffer such that contents of the next received rendered frame are copied into the next texture of the secondary frame buffer.

In a further implementation, the video writer performs a color conversion on the contents of the rendered frame.

The details of one or more implementations of the subject matter described in the present specification are set forth in the accompanying drawings and the description below. Other features, aspects, and advantages of the subject matter will become apparent from the description, the drawings, and the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the implementations. In the following description, various implementations are described with reference to the following drawings, in which.

DETAILED DESCRIPTION

Described herein are various implementations of methods and supporting systems for providing high-performance screen capture for recording videos in mobile applications. The techniques described herein can be implemented in any appropriate hardware or software. If implemented as software, the processes can execute on a system capable of running one or more commercial operating systems such as the MICROSOFT WINDOWS operating systems, the APPLE OS X operating systems, the APPLE IOS platform, the GOOGLE ANDROID platform, the LINUX operating system and other variants of UNIX operating systems, and the like. The software can be implemented on a general purpose computing device in the form of a computer including a processing unit, a system memory, and a system bus that couples various system components including the system memory to the processing unit.

Processors suitable for the execution of software include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. One or more memories can store media assets (e.g., audio, video, graphics, interface elements, and/or other media files), configuration files, and/or instructions that, when executed by a processor, form the modules, engines, and other components described herein and perform the functionality associated with the components. The processor and the memory can be supplemented by, or incorporated in special purpose logic circuitry.

Figure 1:
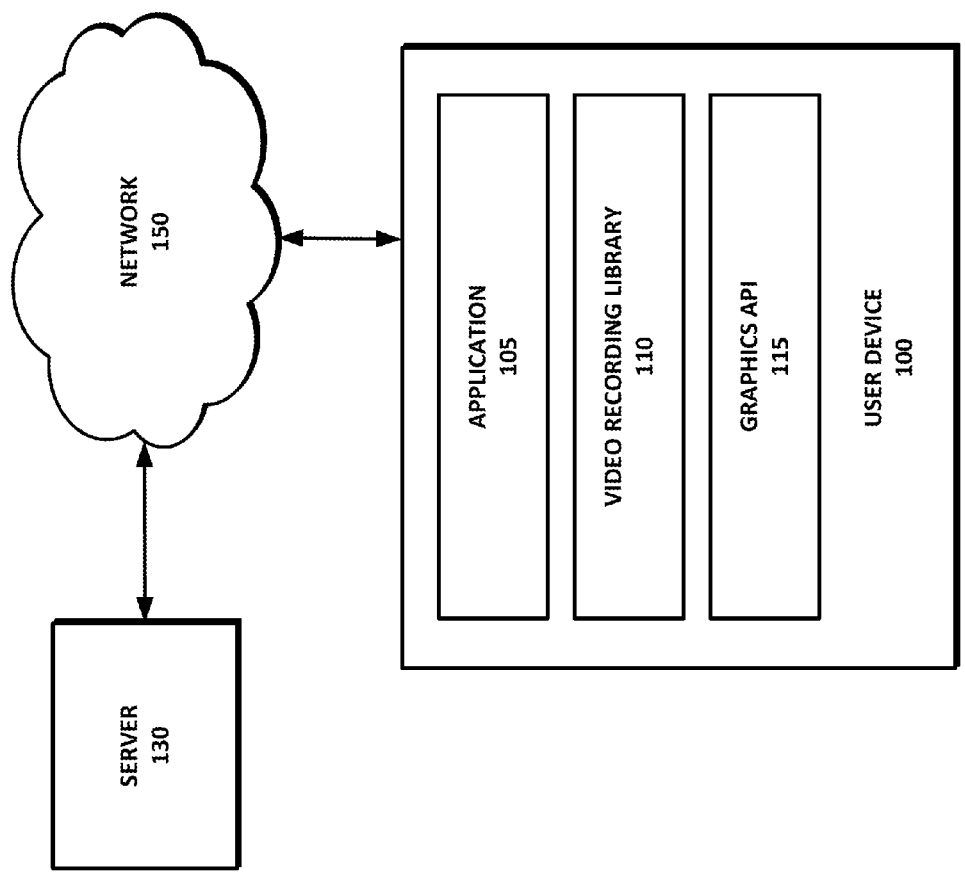
FIG. 1 is a diagram of a high-level system architecture according to an implementation.

Referring to FIG. 1, a video of a game or other user activity or experience can be recorded on user device 100. User device 100 can be, for example, a smartphone, such as an APPLE IPHONE device or an ANDROID-based device, tablet, laptop, palmtop, television, gaming device, music player, information appliance, workstation, personal digital assistant, wireless device, or other computing device, that is operated as a general purpose computer or a special purpose hardware device that can execute the functionality described herein. User device 100 can include a display, such as an integrated or separate display screen, touchscreen, monitor, or other visual output feature. User device 100 can also include an audio output feature, such as speakers. A video recorded on the user device 100 can capture video and/or audio output.

User device 100 includes application 105, video recording library 110, and graphics API 115, which can be implemented, for example, using a plurality of software modules stored in a memory and executed on one or more processors. The modules can be in the form of a suitable programming language or framework, which is converted to machine language or object code or interpreted to allow the processor or processors to read the instructions. Application 105 can be a game, web browser, video player, native application, web application or other application that can interface with video recording library 110 for the recording and creation of a video file. For example, video recording library 110 can be a software library integrated into application 105 and having an application programming interface (API) accessed by application 105 when rendering graphical data for display on an output screen of the user device 100. Video recording library 110 sits between application 100 and a native graphics API 115 used by the user device 100 to render graphics. In one instance, the graphics API 115 is an implementation of the OPENGL API, such as the OPENGL API for embedded systems (OPENGL ES), and video recording library 110 replaces, intercepts, or works in conjunction with OPENGL function calls to provide for the video recording functionality described herein. In other instances, the graphics API 115 includes APIs other than the OPENGL API, such as the IOS METAL interface.

User device 100 can communicate with a server 130 through communications network 150. Server 130 can be implemented in any appropriate hardware or software and can provide, for example, an interface through which user device 100 can upload videos created using the functionality described herein. In some instances, server 130 includes a web server and social medium that allows users to share videos with each other. In one implementation, server 130 includes an audio/video processing server that performs video encoding, compression, color correction, audio processing, and/or other functions on audio/video data provided by user device 100. In one example, user device 100 encodes a video and uploads it to server 130, which can re-encode the video in various bitrates prior to making it available to other users.

Communication over network 150 can occur via any media such as standard telephone lines, LAN or WAN links (e.g., T1, T3, 56 kb, X.25), broadband connections (ISDN, Frame Relay, ATM), wireless links (802.11, Bluetooth, GSM, CDMA, etc.), and so on. The network 150 can carry TCP/IP protocol communications and HTTP/HTTPS requests made by a web browser, and the connection between user device 100 and server 130 can be communicated over such TCP/IP networks. The type of network is not a limitation, however, and any suitable network and protocol(s) can be used.

Method steps of the techniques described herein can be performed by one or more programmable processors executing a computer program to perform functions by operating on input data and generating output. Method steps can also be performed by, and apparatus can be implemented as, special purpose logic circuitry, e.g., an FPGA (field programmable gate array) or an ASIC (application-specific integrated circuit). Modules can refer to portions of the computer program and/or the processor/special circuitry that implements that functionality.

It should also be noted that the present implementations can be provided as one or more computer-readable programs embodied on or in one or more articles of manufacture. The article of manufacture can be any suitable hardware apparatus, such as, for example, a floppy disk, a hard disk, a CD-ROM, a CD-RW, a CD-R, a DVD-ROM, a DVD-RW, a DVD-R, a flash memory card, a PROM, a RAM, a ROM, or a magnetic tape. In general, the computer-readable programs can be implemented in any programming language. The software programs can be further translated into machine language or virtual machine instructions and stored in a program file in that form. The program file can then be stored on or in one or more of the articles of manufacture.

In one implementation, the video recording library 110 enables recording of gameplay or other application activity on the user device 100 by redirecting the application engine to draw, or render, graphical data to a frame buffer containing a special texture instead of the default frame buffer otherwise used by the device 100. As used herein, a "texture" can refer to an object which contains an image, such as an OPENGL texture object that can store one or more images of various types. A "special texture" can refer to a texture allocated using memory accessible by a central processing unit (CPU), such that the CPU can quickly read and access the bytes of a frame rendered to the special texture. The enhanced access speed allows for efficient reading of the texture data and writing of the texture data to a video file. In one instance, a texture is a special texture if its bytes are directly accessible by a CPU using a pointer to memory that was made available when the texture was instantiated.

In one instance, for an OPENGL-based application, instead of using native OPENGL interfaces to access the data of the frames being drawn by the application, the library 110 directs the application to render to a texture backed by non-OPENGL interfaces (e.g., Core Video can be used to allocate the texture on an IOS-based device, and EGL can be used to allocate the texture on an ANDROID-based device). Doing so allows CPU code to efficiently access the rendered graphics frames such that writing those frames to a video file is performed relatively quickly. The advantage of this approach is that gameplay or other application performance while recording is barely impacted, whereas prior approaches of using OPENGL interfaces to read frame data significantly and noticeably impact performance, making such solutions unviable for practical purposes.

The creation of a special texture that can be quickly accessed by the CPU and a video data writing component generally differs for each platform. In one implementation, on the IOS platform with the OPENGL API, a special texture can be created using Core Video framework as follows:

1. Create a CVPixelBufferRef using CVPixelBufferCreate to allocate the memory that will back the texture.
2. Create a CVOpenGLESTextureCacheRef by calling CVOpenGLESTextureCacheCreate.

3. Create a CVOpenGLESTextureRef from the CVOpenGLESTextureCacheRef and CVPixelBufferRef by calling CVOpenGLESTextureCacheCreateTextureFromImage. This provides access to an OPENGL texture backed by the CVPixelBufferRef allocated in step 1 that can be provided to a video writer component.
4. Obtain the OPENGL texture ID for the CVOpenGLESTextureRef in step 3 and attach it to an OPENGL framebuffer via the standard OPENGL API so that it can be rendered to.

In another implementation, on the IOS platform with the METAL interface, a special texture can be created using CoreVideo.framework and Metal.framework:
1. Create a CVPixelBufferRef using CVPixelBufferCreate to allocate the memory that will back the texture.
2. Create a CVMetalTextureCacheRef by calling CVMetalTextureCacheCreate.
3. Create a CVMetalTextureRef from the CVMetalTextureCacheRef and CVPixelBufferRef by calling CVMetalTextureCacheCreateTextureFromImage. This provides access to a METAL texture (an id<MTLTexture>) backed by a CVPixelBufferRef allocated in step 1 that can be provided to a video writer component.
4. For every frame, add an id<MTLBlitCommandEncoder> command to the id<MTLCommandBuffer>, which copies the frame from the current drawable's METAL texture to the id<MTLTexture> created in step 3. This will populate the CVPixelBufferRef allocated in step 1 with the frame contents, which can then be provided to the video writer component.

In another implementation, on the ANDROID platform, a special texture can be created using EGL extensions:
1. Create CPU-accessible graphics memory by calling gralloc.
2. Create an EGLImageKHR by calling eglCreateImageKHR and passing in the memory allocated in step 1.
3. Get the EGL extension method named glEGLImageTargetTexture2DOES and use it to associate the EGLImageKHR created in step 2 with a generic OPENGL texture.
4. Create multiple of the EGLImageKHR backed OPENGL texture created in step 3 and use them as textures to attach to a secondary frame buffer (see ANDROID platform implementation, further described below). The textures can then be read and processed by the CPU and sent to a video writer component.

Figure 2:
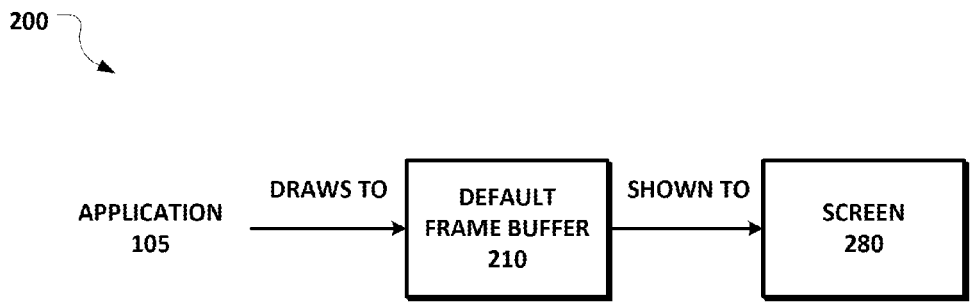
FIG. 2 is a diagram of a default graphics rendering pipeline.

FIG. 2 illustrates one example of a standard graphics rendering pipeline 200 for an application 105 (e.g., a game) that does not incorporate the functionality provided by video recording library 110. In operation, the application 105 draws a scene to the default frame buffer 210, and the scene is shown directly to output screen 280 after the scene has finished drawing. Here, a "frame buffer" can be an allocated portion of memory (e.g., in video RAM) that serves as a buffer for holding rendered image data prior to displaying the data on an output display. A frame buffer can be, for example, an OPENGL "framebuffer" object. In one specific implementation, default frame buffer 210 is an OPENGL "renderbuffer" object.

Figure 3:
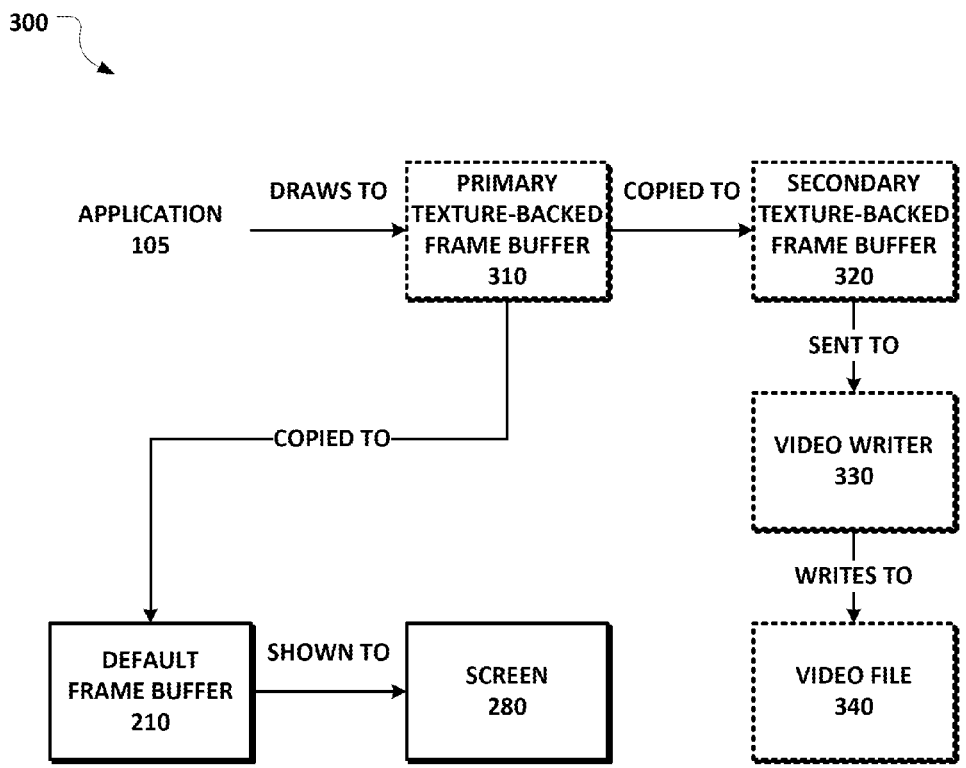
FIGS. 3-7 are diagrams of video recording pipelines according to various implementations.

FIG. 3 depicts an implementation in which video recording library 110 is integrated into application 105 to produce graphics rendering pipeline 300. The additional components of the pipeline 300 are shown in dotted lines, as compared to the components of the original standard pipeline 200, which are shown in solid lines. In essence, the depicted graphics rendering pipeline 300 includes standard pipeline 200 and a video recording pipeline containing primary and secondary frame buffers 310 and 320, video writer 330, and output video file 340. In contrast to the standard pipeline 200 of FIG. 2, instead of drawing to default frame buffer 210, the application 105 renders to primary frame buffer 310. In one implementation, primary frame buffer 310 is backed by an OPENGL texture (rather than, e.g., an OPENGL renderbuffer), which allows the contents of a frame rendered to the primary frame buffer 310 to be copied to other frame buffers.

The contents of the primary frame buffer 310 are then copied to a secondary frame buffer 320, which is backed by a special texture that allows the CPU to quickly and efficiently read the bytes that represent a rendered frame. The use of the special texture helps to avoid unacceptable performance degradation that would otherwise accompany video recording during gameplay or other application use. Further, the use of the secondary frame buffer 320 with the primary frame buffer 310 also acts as a double-buffering scheme to prevent tearing in recorded video. That is, if the contents of the primary frame buffer 310 were fed directly to video writer 330, it is possible for the application 105 to begin drawing the next frame while the video writer 330 is attempting to process and record the previous frame, thereby causing an undesirable tearing effect.

After being copied into secondary frame buffer 320, the special texture data (bytes) are sent to video writer 330 (using, for example, a background thread or process), which asynchronously encodes and writes the frame to video file 340. Further, while the rendered data is proceeding along the video recording pipeline, the frame contents can be copied from the primary frame buffer 310 to the default frame buffer 210 for output to screen 280 (i.e., along the standard pipeline 200).

Figure 4:
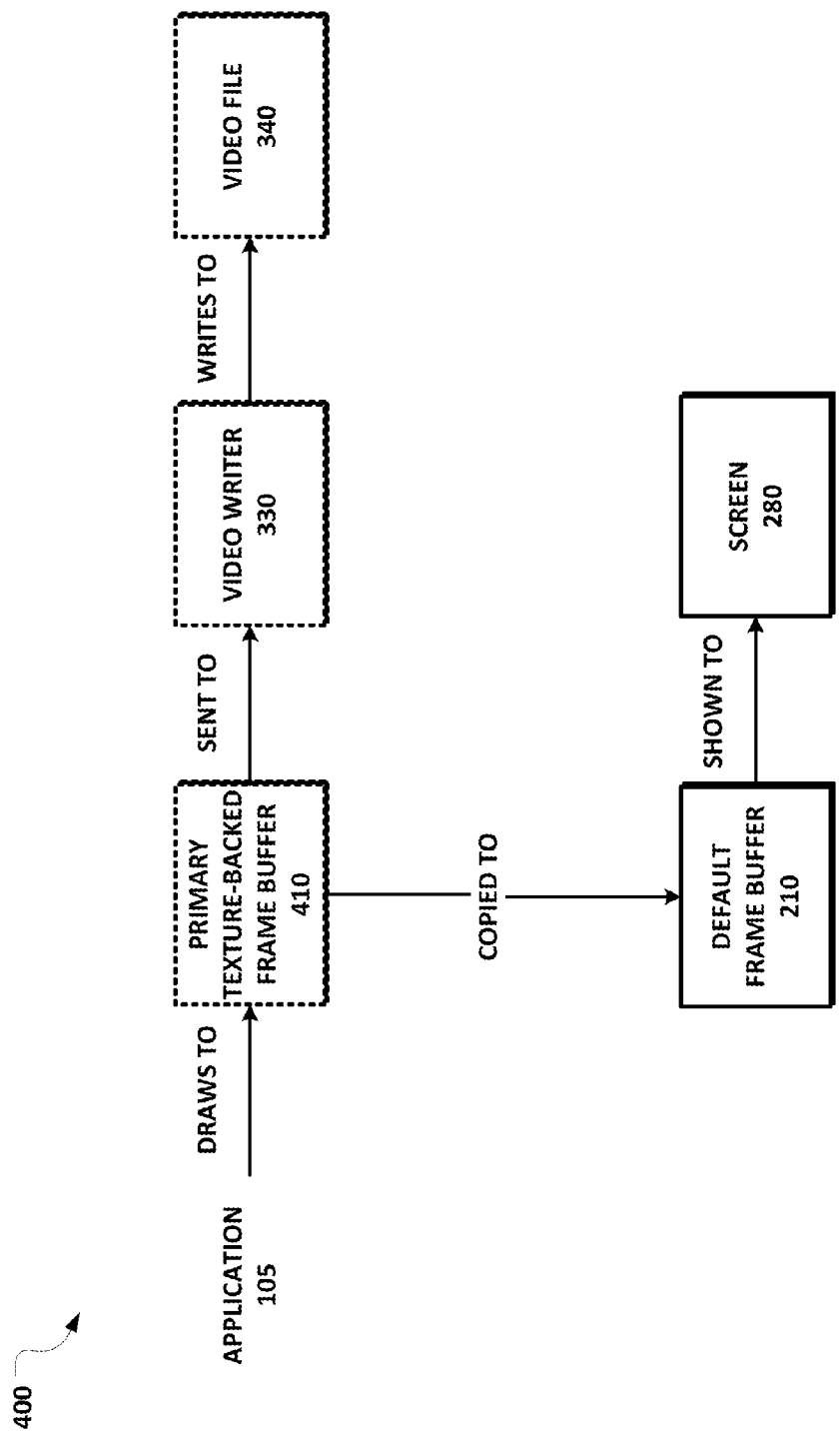

In another implementation, shown in FIG. 4, a graphics rendering pipeline 400 omits a secondary frame buffer. Instead, the primary frame buffer 410 is backed with a special texture that allows for fast access and reading of the allocated texture bytes by a CPU. Sending the contents of the primary frame buffer 410 directly to video writer 330, rather than copying the data to a secondary frame buffer (as shown in FIG. 3), provides for better performance (i.e., less delay) when recording video compared to rendering pipeline 300. However, as noted above, the use of a single frame buffer can result in tearing.

Figure 5:
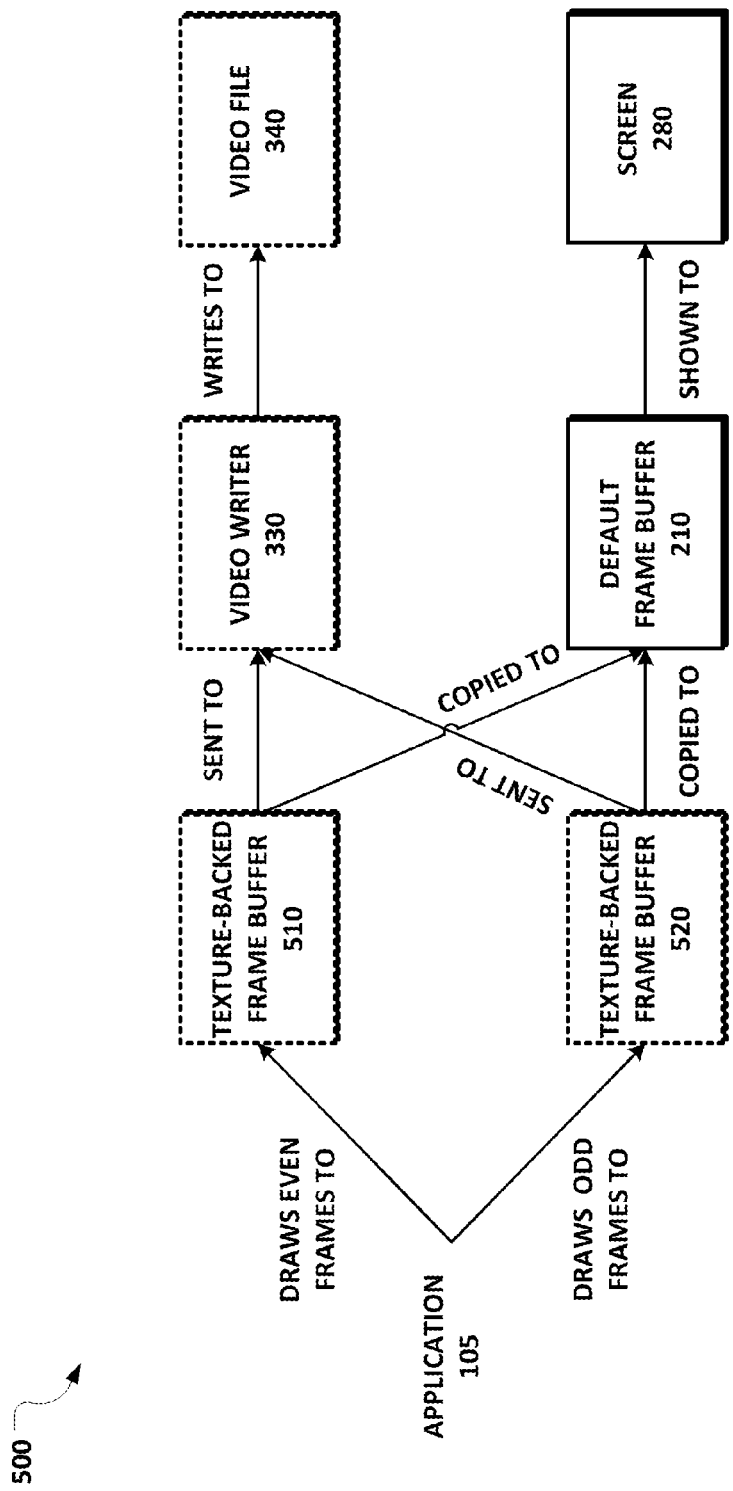

Referring now to FIG. 5, a graphics rendering pipeline 500 provides the performance advantages of the pipeline 400 shown in FIG. 4, while preventing possible tearing at the cost of additional memory use. Pipeline 500 includes two frame buffers 510 and 520, each backed by special textures that allow for fast CPU access such that video writer 330 can efficiently write frames to video file 340. Here, application 105 alternates between frame buffer 510 and frame buffer 520 when drawing frames. For example, application 105 can draw all even-numbered frames to frame buffer 510, and can draw all odd-numbered frames to frame buffer 520. Once each frame is drawn, the pipeline 500 continues in a similar fashion to pipelines described above. That is, the contents of each frame can be copied to default frame buffer 210 for display on screen 280, and the contents of each frame can be sent to video writer 330 for output to video file 340.

Figure 6:
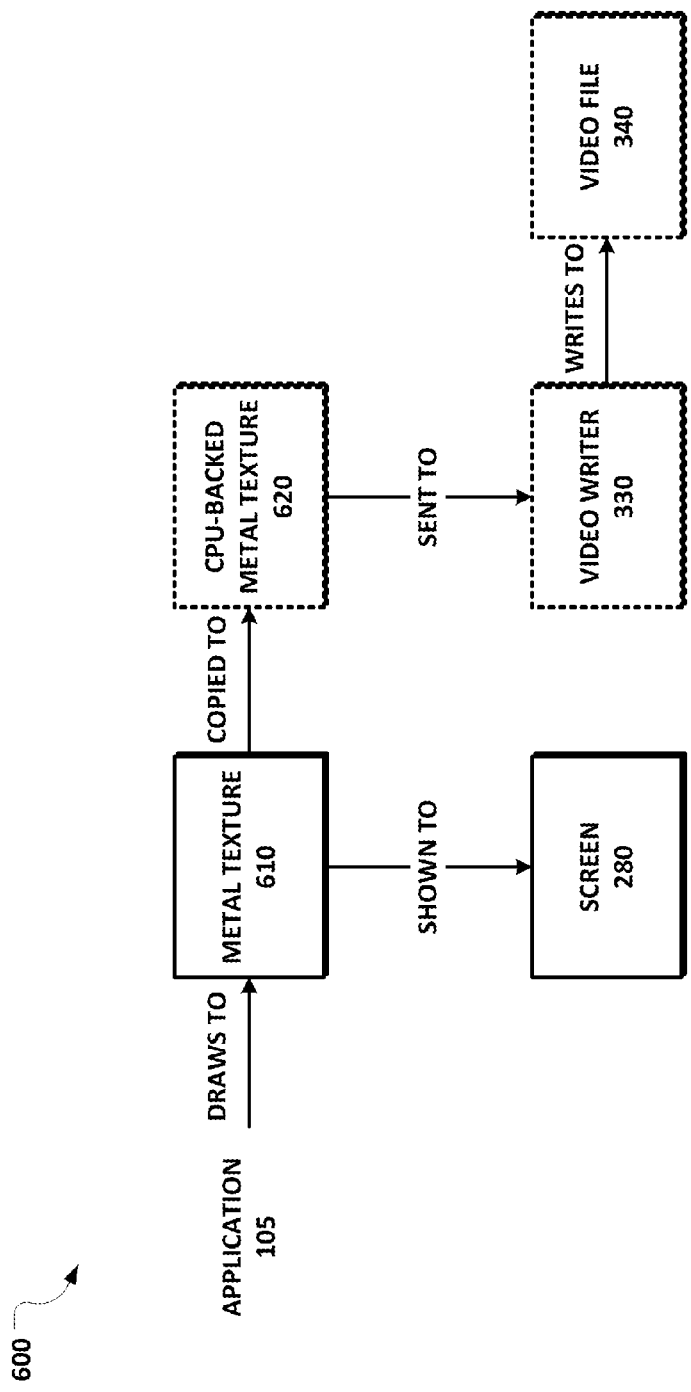

FIG. 6 depicts one implementation of a graphics rendering pipeline 600 for video recording on a IOS-based device that uses the METAL graphics API. The METAL interface rendering process is different from the OPENGL interface in that the default render target is a texture 610 that can be copied from and sampled. Thus, in addition to the METAL texture 610 supplying rendered frames to display screen 280, the texture 610 provides for the direct copying of the rendered frame contents from the texture 610 to a special texture 620 whose memory is backed by CPU-accessible memory. Following the copying of the frame to the special texture 620, the bytes from that texture 620 can be provided to video writer 330 for output to video file 340.

Figure 7:
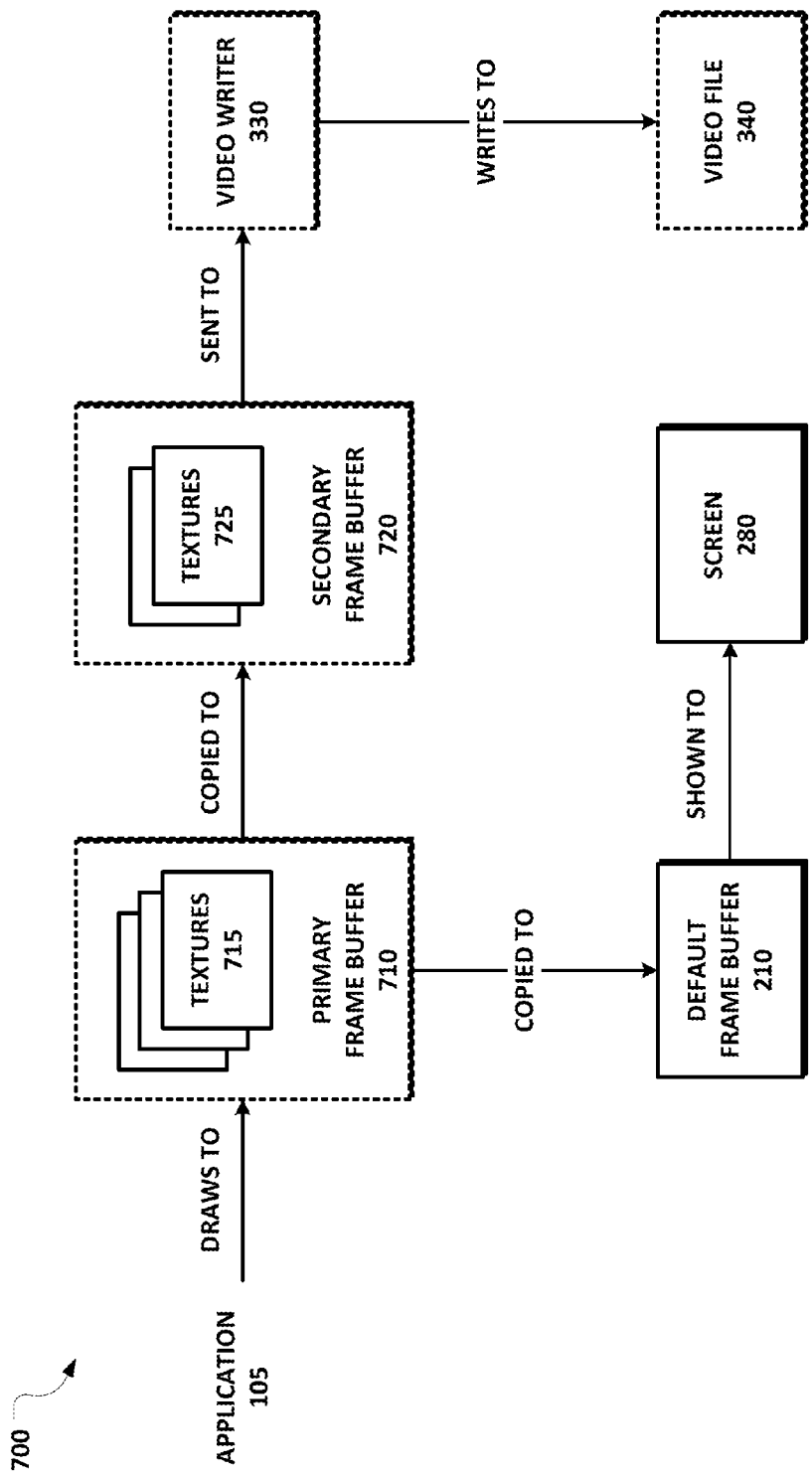

FIG. 7 illustrates one implementation of a graphics rendering pipeline 700 for video recording on an ANDROID platform. This pipeline 700 is similar to the pipeline 300 shown in FIG. 3; that is, there is a primary frame buffer 710 and a secondary frame buffer 720. However, due to timing in performance issues, it is insufficient on an ANDROID-based device to have only one texture in the primary frame buffer 710 and/or the secondary frame buffer 720. Thus, in this instance, one or both of the frame buffers 710, 720 include multiple textures 715, 725 used in a rotating or otherwise alternating manner. For example, the textures 715, 725 in either or both of frame buffers 710, 720 can be configured as a circular buffer. In one implementation, the textures 715 in the primary frame buffer 710 are standard OPENGL texture objects, and the textures 725 in the secondary frame buffer 720 are special textures.

Figure 8:
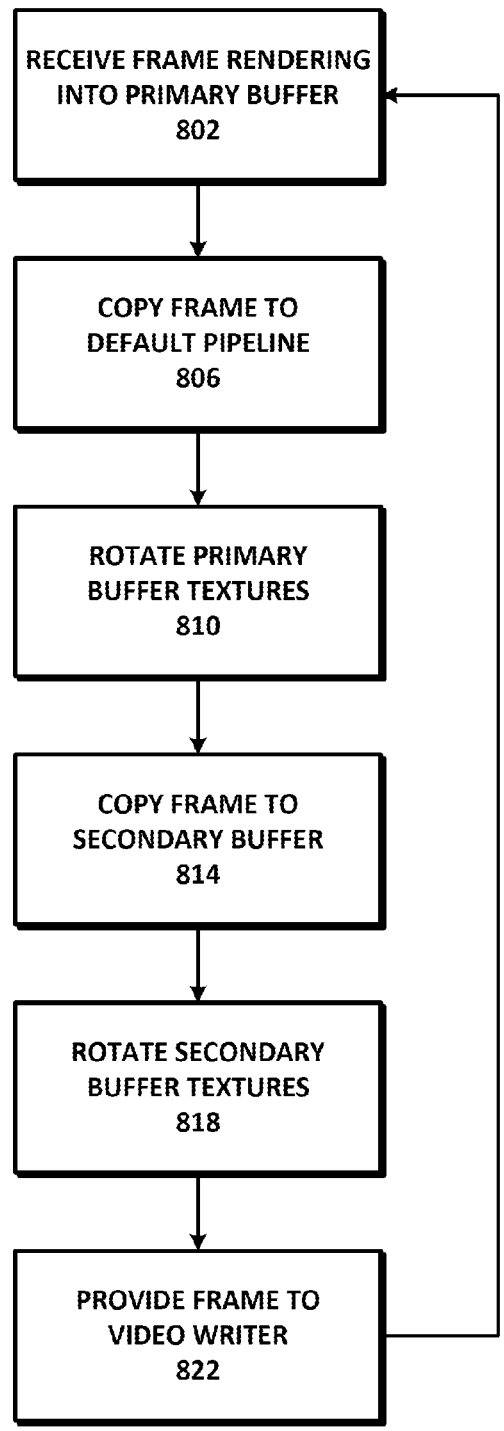
FIG. 8 is a flowchart depicting an example method for efficient screen capture.

Referring to both FIGS. 7 and 8, in one example, pipeline 700 operates as follows, with the individual textures 715 in the primary frame buffer 710 being referred to as P0, P1, and P2, and the individual textures 725 in the secondary frame buffer 720 being referred to as S0 and S1. Assume that P0 and S0 are currently bound to their respective frame buffers 710 and 720. In STEP 802, application 115 renders a first frame into texture P0 of primary frame buffer 710. The contents of the first frame are copied from the default frame buffer 210 for display on an output screen 280 (STEP 806). When the first frame is finished rendering and after it has been copied to the default frame buffer 210, P0 is detached from the primary frame buffer 710 and P1 is attached in its place (STEP 810). P1 is then ready to receive the next rendering of a frame. The contents of the first frame are copied from P0 to texture S0 in secondary frame buffer 720 (STEP 814). In STEP 818, S0 is detached from the secondary frame buffer 720 and S1 is attached in its place, allowing for S1 to receive the next rendered frame.

In some implementations, the contents of the frame in S0 are processed by performing a color conversion from RGB to YUV space. In STEP 822, the converted bytes are provided to a video encoder and writer. The process continues for each subsequent frame, and the textures 715, 725 in both the primary frame buffer 710 and secondary frame buffer 720 are rotated forward one at a time in the manner described above. For example, for the next frame, P1 is attached to the primary frame buffer 710 and S1 is attached to the secondary frame buffer 720. The contents of the frame in P1 are then copied into S1, and both frame buffers 710, 720 can be rotated to texture P2 and S0, respectively. Of note, the frame buffers 710, 720 can operate independently of each other and rotate their respective textures 715, 725 after the contents of a frame have been fully rendered to or copied to a particular buffer 710, 720. In some instances, if there are delays in the rendering pipeline the primary buffer 710 and/or secondary buffer 720 can drop frames (i.e., not pass frames along the pipeline) in order to accommodate arriving frames.

Although the primary and secondary frame buffers 710, 720 are shown as containing three and two textures, respectively, other numbers of textures are possible depending on the implementation. For example, it may be necessary to balance memory usage (more textures uses more memory) with the desire to avoid dropped frames (more textures allows for greater ability to queue frames). A sufficient number of textures allows the application 105 to continue rendering frames independently of the rest of the video processing pipeline (i.e., the secondary frame buffer 720 and onwards). For example, a sufficient texture queue allows the application 105 to render to P1 even if P0 has yet to be copied to the secondary frame buffer 720, or even to P2 if the rendering pipeline falls further behind. Using three textures in the primary frame buffer 710 and two textures in the secondary frame buffer 720 has shown to be sufficiently robust to record video without dropping too many frames and, further, has shown to prevent both flickering on the screen 280 and tearing in the final recorded video 340. In other implementations, a similar effect can be achieved by including additional frame buffers in the pipeline 700. Further, it should be noted that the above steps need not be performed in precisely the same order, depending on the implementation; for example, the rotation of buffer textures and copying of frame data can occur at differing times in the process and at different points with respect to each other.

Figure 9:
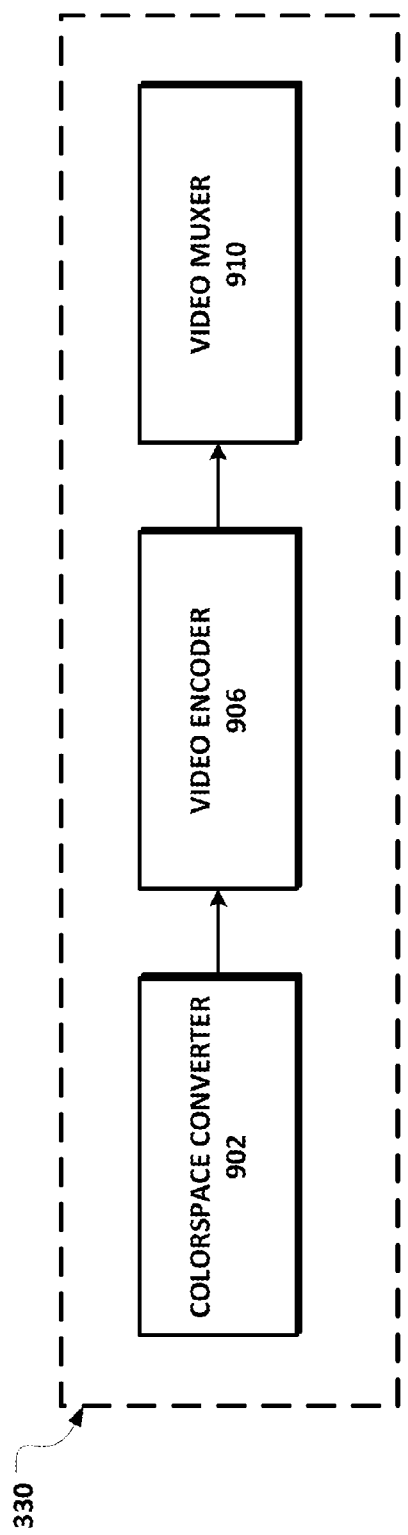
FIG. 9 is a diagram depicting the components of a video writer according to an implementation.

FIG. 9 depicts one implementation of video writer 330, in which video writer 330 includes colorspace converter 902, video encoder 906, and video muxer 910. Colorspace converter 902 corrects for differences in colorspace between input and output graphical data. For example, OPENGL-based systems and various other graphics systems operate in the RGB colorspace, whereas video codecs specifications like H.264 operate in the YUV colorspace. The pixel values are changed to the YUV colorspace so that the colors in output video 340 are correct. The video writer 330 can incorporate a color correction library that is parallelized and uses CPU-specific optimized assembly instructions (e.g., NEON for ARM and SSE3 for x86). Video encoder 906 compresses raw YUV pixel data into a compressed format such as H.264. Video muxer 910 adds compressed video frames to the video track of output video file 340 (in addition to any audio track(s) that may also exist).

In one example, referring again to the graphics rendering pipeline 700 of FIG. 7, the contents of rendered frames in the textures 725 of the secondary frame buffer 720 can be color converted from RGB to YUV by color converter 902. Each color converted frame can then be provided as input into video encoder 906. For instance, a frame can be input to the encoder 906 after it has finished processing the previous frame. After a frame has been encoded, it is sent to the video muxer 910, where it is combined with an audio track (if any) and written to video file 340.

As noted above, the functionality described herein can be provided as a video recording library 110 or an integrated third-party software development kit (SDK). This approach provides game and other application developers with the ability to simply download the SDK and easily integrate it into their applications, saving the developers from having to build the entire gameplay recording software themselves. Furthermore, game players and other application users do not have to purchase third party recording tools, nor do they have to actively think about when they want to record. Recording sessions can be automatically programmed by the application developer, and the recording, watching, and sharing process can be naturally built into the application's flow and user experience.

In one implementation, on the IOS platform, the library 110 is compiled and built into the application 105 (e.g., a game). When the game is launched from a mobile phone, the library 110 detects the game engine among a variety of known game engines and automatically integrates itself into the graphics rendering pipeline of the game engine. The integration can occur on application load using a method known as "swizzling," where existing methods are replaced with methods provided by the library 110 that add certain functionality as described herein. This change allows for gameplay recording of the video and audio of the game.

In the case, however, that the application developer uses a game engine that is not automatically detected by the library, the developer can use API hooks to integrate the gameplay recording technology provided by the library 110 into the game engine. One example of this API for an OPENGL-based game engine in Objective-C is as follows:

```
/***
 *
 * Set the OPENGL context and layer.
 *
 */
+(BOOL)initWithEAGLContext:(EAGLContext *)context
    layer:(CAEAGLLayer *)layer;
/***
 *
 * Create internal framebuffers used in gameplay recording
 * based on the game engine's default framebuffer and/or
     MSAA framebuffer.
 *
 */
+(BOOL)createFramebuffers:(GLuint)defaultFramebuffer
    msaaFramebuffer:(GLuint)msaaFramebuffer;
/***
 *
 * Delete internal framebuffers used in gameplay recording.
 *
 */
+(void)deleteFramebuffers;
/***
 *
 * Before presenting the frame to the device's screen, copy
 * the frame from the internal recording framebuffer to
 * the default framebuffer.
 *
 */
+(BOOL)beforePresentRenderbuffer:(GLuint)framebuffer;
/***
 *
 * After presenting the frame to the device's screen,
 * bind the internal recording framebuffer if
 * going to record the next frame.
 *
 */
+(BOOL)afterPresentRenderbuffer;
/***
 *
 * Anywhere where one would bind the default framebuffer,
 * bind the framebuffer that's returned by this functional call
     instead.
 * This will return the correct framebuffer based on whether or
     not
 * gameplay recording is currently happening.
 *
 */
+(GLuint)activeFramebuffer;
```

By inserting the above function calls in the appropriate places in an IOS-based game engine's rendering pipeline, gameplay recording functionality can be provided in a way that resembles the graphics rendering pipeline 300 shown in FIG. 3.

An example API for the IOS METAL interface integration is as follows:

```
/***
 *
 * Set the METAL layer and device so that necessary modifi-
    cations
 * can be made to those objects and the rendering pipeline.
 *
 */
+(void)configureLayer:(CAMetalLayer*)layer fromDevice:
    (id<MTLDevice>)device;
/***
 *
 * Ensures readiness to start capturing frames.
 *
 */
+(void)setCurrentDrawable:(id<CAMetalDrawable>)draw-
    able;
/***
 *
 * Add the commands to the METAL command buffer to copy
 * the frames to CPU-readable memory.
 *
 */
+(void)addMetalCommands:(id<MTLCommandbuffer>)
    commandBuffer;
```

Referring to the METAL-based functions above, the configureLayer method allows the layer and device to be saved for later use, and also changes the layer's mode so that created textures can be accessed and sampled. The setCurrentDrawawble method updates the current METAL drawable such that the drawable and texture to read from is made known. In some implementations, this method is unnecessary and can be removed by a proper application of swizzling on the CAMetalLayer nextDrawable method. The addMetalCommands method determines if the current frame is being recorded and, if so, copies the screen's texture to a special texture that can be accessed by the CPU and provided to the video writer 330.

In another implementation, on the ANDROID platform with the OPENGL interface, the library 110 is compiled and built into the game. When the game is launched, the library 110 automatically integrates into the game engine's rendering lifecycle using, for example, a method known as "function hooking," which allows the library 110 to intercept and replace function calls with its own function calls. Specific OPENGL and EGL methods can be replaced to change the game engine's rendering pipeline in a way that resembles the graphics rendering pipeline 300 shown in FIG. 3.

This technique can be used to modify the behavior of OPENGL functions so that graphics drawn by the application 105 are automatically directed to a frame buffer which can be captured, as described herein. In one example, in OPENGL ES 2.0 on the ANDROID platform, in native C code compiled for ARM, the function glBindFramebuffer( ) can be intercepted as follows:

1. Write a C function trampoline_glBindFramebuffer( ) with a signature matching that of glBindFramebuffer( ) and initially populated with no-op instructions.
2. Write a C function patched_glBindFramebuffer( ) with a signature matching that of glBindFramebuffer( ) to be called in place of glBindFramebuffer( ).

3. Use the Unix C function mprotect( ) to allow writing to executable memory for functions which must be modified.
4. Replace the first 8 bytes of the body of glBindFramebuffer( ) with the word 0xe51ff004 followed by the address of patched_glBindFramebuffer( ).
5. Write the 8 bytes originally residing at the beginning of glBindFramebuffer( ) into the first 8 bytes of trampoline_glBindFramebuffer( ).
6. In the following 8 bytes of trampoline_glBindFramebuffer( ) write the word 0xe51ff004 followed by the address of the first unaltered instruction of glBindFramebuffer( ).
7. Write the body of patched_glBindFramebuffer( ) to get custom behavior. Have patched_glBindFramebuffer( ) appeal to trampoline_glBindFramebuffer( ) to get the original behavior.

In this example, the word 0xe51ff004 is an ARM machine-code instruction which redirects execution to the address in the following word. The above technique can be used whenever the instruction set of the patching code and the instruction set of the function being modified are both full 32-bit ARM instructions. With respect to glBindFramebuffer( ) specifically, for instance, the function it is replaced with (i.e., patched_glBindFramebuffer( )) is written to redirect the OPENGL function to bind the frame buffer in the added video recording pipeline, as opposed to the default frame buffer of the application 105 (most of the time). This way, the scene being drawn can be appropriately captured.

In other example, to patch a THUMB function (e.g., eglSwapBuffers( ), an additional instruction can be used as follows:
1. Write a C function trampoline_eglSwapBuffers( ) with a signature matching that of eglSwapBuffers( ) and initially populated with no-op instructions.
2. Write a C function patched_eglSwapBuffers( ) with a signature matching that of eglSwapBuffers( ) to be called in place of eglSwapBuffers( ).
3. Use the Unix C function mprotect( ) to allow writing to executable memory for functions which must be modified.
4. Replace the first 12 bytes of the body of eglSwapBuffers( ) with the words 0x4b434778, 0xe51ff004 followed by the address of patched_eglSwapBuffers( ).
5. Write the 12 bytes originally residing at the beginning of eglSwapBuffers( ) into the first 12 bytes of trampoline_eglSwapBuffers( ).
6. In the following 12 bytes of trampoline_eglSwapBuffers( ) write the words 0x4b434778, 0xe51ff004 followed by the address of the first unaltered instruction of eglSwapBuffers( ) with the least-significant bit set high.
7. Write the body of patched_eglSwapBuffers( ) to get custom behavior. Have patched_eglSwapBuffers( ) appeal to trampoline_eglSwapBuffers( ) to get the original behavior.

In this example, the word 0x4b434778 is two THUMB instructions which switch the processor to ARM mode just in time to use the ARM patching mechanism in the following word. Patching eglSwapBuffers( ) can be used to determine when the application 105 has finished drawing a frame. In this manner, per-frame work is made possible (such as performing a texture copy, binding certain frame buffers, etc.) without the application developer having to make an explicit per-frame call.

The performance gains provided by the techniques described herein (in particular, the use of special textures) are significant and make gameplay video recording a possibility for both the IOS platform and ANDROID platform. Table 1 and Table 2 show the performance impacts of these recording integrations with OPENGL-based games on various platforms.

TABLE 1

IOS OPENGL performance benchmarks per frame. Lower is better.

| Device | CPU ms/ frame | GPU ms/ frame | CPU ms/frame (with video recording) | GPU ms/frame (with video recording) | Video recording CPU ms/ frame overhead | Video recording GPU ms/ frame overhead |
|---|---|---|---|---|---|---|
| IPAD 2 device | 35.3 | 28.8 | 39 | 29.1 | 3.7 | 0.3 |
| IPAD MINI device | 27.7 | 10.8 | 30 | 10.8 | 2.3 | 0 |
| IPAD 3 device | 27.3 | 18.8 | 30.6 | 19.3 | 3.3 | 0.5 |
| IPAD 4 device | 14.5 | 13.9 | 15.7 | 14.5 | 1.2 | 0.6 |
| IPAD MINI RETINA device | 19 | 17 | 21 | 17 | 2 | 0 |
| IPHONE 5 device | 16 | 5.9 | 16.7 | 5.9 | 0.7 | 0 |
| IPOD TOUCH 5G device | 36.8 | 11.9 | 39.4 | 11.9 | 2.6 | 0 |

TABLE 2

ANDROID OPENGL performance benchmarks per frame. Lower is better.

| Device (ANDROID OS Version) | ms/ frame | ms/frame (with video recording) | Video recording ms/frame overhead |
|---|---|---|---|
| GALAXY S3 device-Exynos Board (4.3) | 18.3 | 24.1 | 5.8 |
| GALAXY S4 device-Qualcomm Board (4.3) | 24.3 | 32.1 | 7.8 |
| GALAXY S5 device-Qualcomm Board (4.4) | 17.3 | 21.4 | 4.1 |
| NEXUS 4 device (4.2) | 21.7 | 25.1 | 3.4 |
| NEXUS 7 device (4.1) | 24.8 | 33.6 | 8.8 |
| NEXUS 7 HD device (4.4) | 24 | 30.1 | 6.1 |
| XPERIA Z1 SO-01F device (4.2) | 17.3 | 19.4 | 2.1 |
| NOTE 2 device (4.3) | 17.3 | 22.7 | 5.4 |

The columns that are most relevant in the tables above are the "overhead" columns, which indicate the performance cost of using the present techniques. Notably, the overhead is very small. Specifically, for the IOS platform, most of the overhead values are near zero and, for the ANDROID platform, most of the numbers are low single digits. This is a massive improvement over the standard frame copying approach of using the glReadPixels function, which for the IOS platform can take 10-20 ms/frame and for the ANDROID platform can take over 200 ms/frame. This performance improvement is a quantitative and qualitative difference which enables video recording to be practically used in games as, otherwise, the glReadPixels approach would render the game unplayable.

The terms and expressions employed herein are used as terms and expressions of description and not of limitation, and there is no intention, in the use of such terms and expressions, of excluding any equivalents of the features shown and described or portions thereof. In addition, having described certain implementations in the present disclosure, it will be apparent to those of ordinary skill in the art that other implementations incorporating the concepts disclosed herein can be used without departing from the spirit and scope of the invention. The features and functions of the various implementations can be arranged in various combinations and permutations, and all are considered to be within the scope of the disclosed invention. Accordingly, the described implementations are to be considered in all respects as illustrative and not restrictive. The configurations, materials, and dimensions described herein are also intended as illustrative and in no way limiting. Similarly, although physical explanations have been provided for explanatory purposes, there is no intent to be bound by any particular theory or mechanism, or to limit the claims in accordance therewith.

What is claimed is:

1. A method comprising:
providing a software-based video recording pipeline comprising:
a primary frame buffer object having a first plurality of textures attached thereto;
a secondary frame buffer object having a second plurality of textures attached thereto, wherein memory allocated to each of the second plurality of textures is directly accessible by a central processing unit; and
a video writer module for writing data to a video file;
receiving into a texture attached to the primary frame buffer object a rendering of a frame;
copying data of the rendered frame from the texture attached to the primary frame buffer object to a texture attached to the secondary frame buffer object and to a default graphics rendering pipeline for output to a display; and
providing a location of the rendered frame data in the texture attached to the secondary frame buffer object to the video writer module for output of the rendered frame data to the video file.

2. The method of claim 1, wherein the primary frame buffer object is configured as a circular buffer.

3. The method of claim 1, wherein the secondary frame buffer object is configured as a circular buffer.

4. The method of claim 1, wherein the rendered frame is rendered by an application on a mobile device.

5. The method of claim 4, wherein the video recording pipeline is provided as a library that interfaces with the mobile device application.

6. The method of claim 1, wherein copying the rendered frame data to the default graphics rendering pipeline comprises copying the rendered frame data to a default frame buffer in the default graphics rendering pipeline.

7. The method of claim 1, further comprising switching to a next one of the textures attached to the primary frame buffer object such that a next frame is rendered to the next texture attached to the primary frame buffer object.

8. The method of claim 7, further comprising switching to a next one of the textures attached to the secondary frame buffer object such that data of the next rendered frame is copied into the next texture attached to the secondary frame buffer object.

9. The method of claim 1, wherein the video writer module performs a color conversion of the rendered frame data.

10. A system comprising:
one or more computers programmed to perform operations comprising:
providing a software-based video recording pipeline comprising:
a primary frame buffer object having a first plurality of textures attached thereto;
a secondary frame buffer object comprising having a second plurality of textures attached thereto, wherein memory allocated to each of the second plurality of textures is directly accessible by a central processing unit; and
a video writer module for writing data to a video file;
receiving into a texture attached to the primary frame buffer object a rendering of a frame;
copying contents data of the rendered frame from the texture attached to the primary frame buffer object to a texture attached to the secondary frame buffer object and to a default graphics rendering pipeline for output to a display; and
providing a location of the rendered frame data in the texture attached to the secondary frame buffer object to the video writer module for output of the rendered frame data to the video file.

11. The system of claim 10, wherein the primary frame buffer object is configured as a circular buffer.

12. The system of claim 10, wherein the secondary frame buffer object is configured as a circular buffer.

13. The system of claim 10, wherein the rendered frame is rendered by an application on a mobile device.

14. The system of claim 13, wherein the video recording pipeline is provided as a library that interfaces with the mobile device application.

15. The system of claim 10, wherein copying the rendered frame data to the default graphics rendering pipeline comprises copying the rendered frame data to a default frame buffer in the default graphics rendering pipeline.

16. The system of claim 10, wherein the operations further comprise switching to a next one of the textures attached to the primary frame buffer object such that a next frame is rendered to the next texture attached to the primary frame buffer object.

17. The system of claim 16, wherein the operations further comprise switching to a next one of the textures attached to the secondary frame buffer object such that data of the next rendered frame is copied into the next texture attached to the secondary frame buffer object.

18. The system of claim 10, wherein the video writer module performs a color conversion on the rendered frame data.

* * * * *